Dec. 20, 1949  W. A. RAY  2,491,906
BRIDGE CIRCUIT CONTROL SYSTEM
Filed Dec. 26, 1944
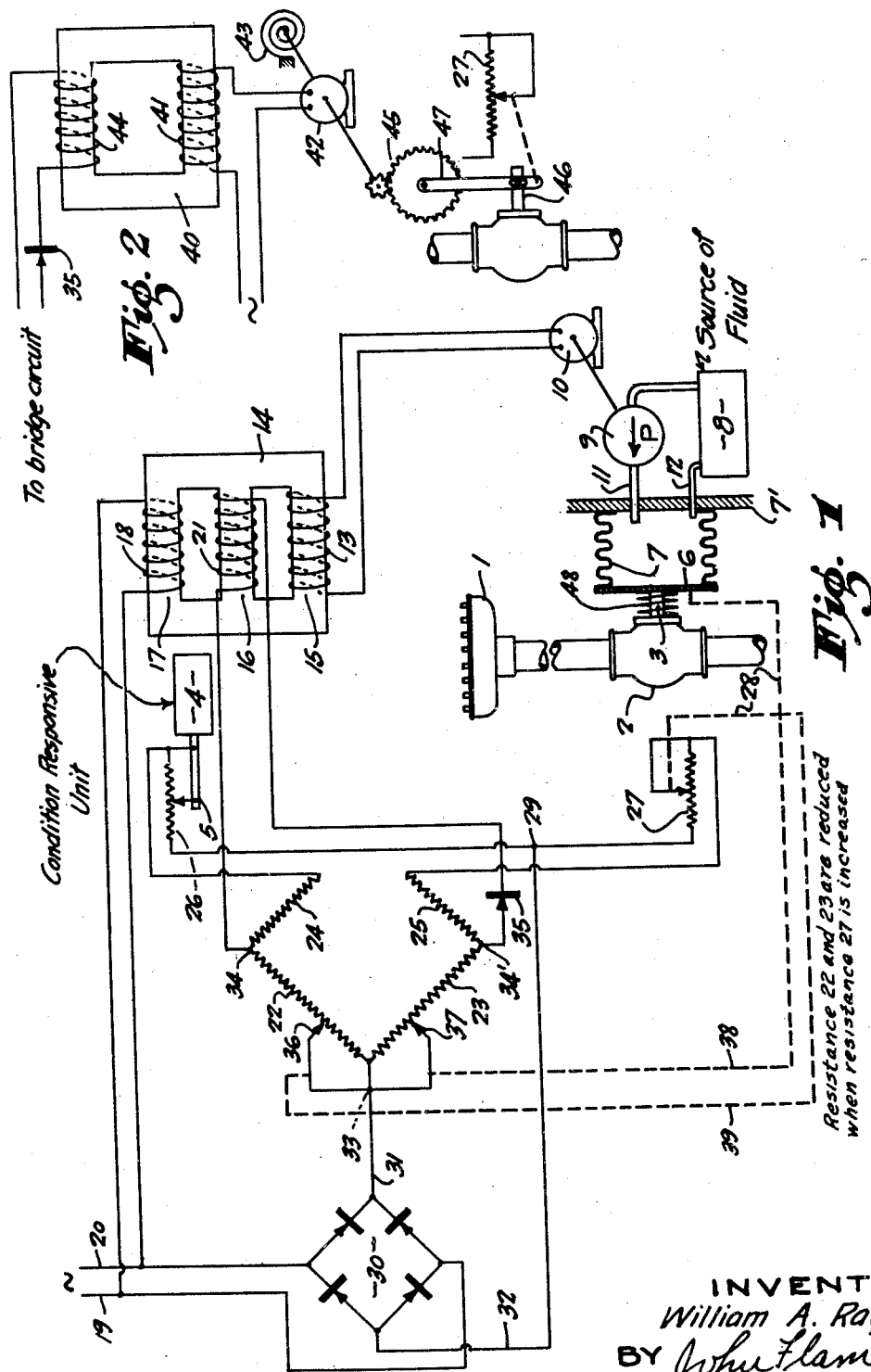
INVENTOR
William A. Ray
BY John Flam
ATTORNEY Patented Dec. 20, 1949

2,491,906

UNITED STATES PATENT OFFICE 2,491,906

BRIDGE CIRCUIT CONTROL SYSTEM

William A. Ray, Glendale, Calif., assignor to General Controls Co., a corporation Application December 26, 1944, Serial No. 569,794

5 Claims. (Cl. 318—29)

This invention relates to a system for positioning a controlling member. The controlling member may be used to vary a condition, such as to adjust the degree of opening of a valve. The valve may, in turn, be used for controlling the degree of heat or of refrigeration if the system is one for temperature control; but the same principles could be applied to control other factors, such as pressure, light, electrical resistance, etc.

It is one of the objects of this invention to provide a simple and reliable system of this character.

For this purpose, use is made of an electrical system that may be supplied from a common source of commercial alternating current power. The system operates a source of motion that is caused to come to rest at a position corresponding quantitatively to the degree of control required at any instant. The source of motion may be a hydraulic motor, the motion of which corresponds to the pressure of the fluid therein, or a torque motor that stalls after a definite resilient resistance is reached.

It is another object of this invention to make it possible to energize the motor in such manner that it responds continuously in accordance with the variation in the condition that is controlled. For example, if temperature control is required, the motor moves to a position corresponding to the deviation of the temperature from that desired; and the valve that controls a burner or a refrigerating fluid is opened to an extent corresponding to the deviation; and this adjustment is accomplished without opening or closing any circuits.

It is another object of this invention to provide a control system in which the deviation of the condition, such as temperature, from a desired value correspondingly alters the electromotive force for operating the controlling motor. Preferably this is accomplished by varying the saturation of a part of a magnetic circuit either to vary the degree of coupling between transformer windings, or the reactance of a coil disposed over a portion of the magnetic circuit.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best described by the appended claims.

Referring to the drawings:

Figure 1 is a diagram illustrating one embodiment of the invention; and

Fig. 2 illustrates a modified form of the invention.

In the present instance, the system is shown as controlling the temperature in a space or room by the aid of a fluid fuel burner 1. Fuel passes to the burner 1 through a valve structure 2 having a stem 3.

A condition responsive unit 4 may be a thermostat capable of moving a member 5 in accordance with variations in temperature of the space or room being controlled. The position of arm 5 is thus a function of the temperature.

Automatic operation of the main valve 2 for controlling burner 1 is effected by a motor means that regulates the position of the stem 3. This motor means includes a movable controlling member 6. This may be the left-hand wall of a bellows or "sylphon" 7. The right-hand wall of the bellows is attached to a stationary wall 7'.

The position of the controlling member 6 is dependent upon the pressure of fluid within the bellows 7. This fluid may be a liquid obtained from a source or reservoir 8.

The motor means includes a pump and an electric motor 10 for driving it. The pump 9 is arranged to pump fluid into the interior of the bellows 7 through a conduit 11. The fluid may escape from the interior of the bellows through a bleed orifice formed at the inner end of conduit 12, extending into the bellows 7. A spring 48 which may be interposed between the body of the valve 2 and member 6 urges the valve to closed position and opposes movement of the member 6 to the left, corresponding to an increase in the volume of the bellows.

When the pump 9 is operated to deliver fluid to the bellows 7 at a rate faster than the fluid can escape through orifice 12, pressure will be built up in bellows 7 sufficient to overcome the force of spring 48 and member 6 will be moved toward the left. When the pump is operated at a slower rate so that fluid escapes through orifice 12 faster than it is delivered, the pressure within the bellows 7 will fall, allowing member 6 to move to the right under the influence of spring 48. When the rate of supply equals the rate of escape, a condition of equilibrium will be established and member 6 will be held against movement.

Accordingly, the position that controlling member 6 assumes is determined by the force that is exerted by the motor 10 to drive pump 9.

The electromotive force impressed upon motor 10 in this instance is derived from secondary winding 13 mounted on one leg or branch 15 of a magnetic circuit formed as an iron core 14, with the three branches 15, 16, and 17.

The primary winding 18, disposed on leg or branch 17, is connected to a source of alternating current, as by the aid of the mains 19 and 20.

The rate of energy transfer between the primary winding 18 and the secondary winding 13 is dependent upon the amount of diversion of magnetic flux from leg 17 into the intermediate branch 16. In the present instance, the diversion of the flux through this branch is effected by varying the saturation of the branch 16 by a coil or winding 21 through which is passed a unidirectional current. The value of this current is a function of the temperature of the space to be controlled, as indicated by the position of arm 5.

When the thermostat 4 operates to demand more heat, the current through the winding 21 on branch 16 is increased. The branch 16, is, therefore, more saturated and, accordingly, less flux is permitted to pass through branch 16, and more of it passes through the branch 15. Correspondingly, the transfer of energy to motor 10 is increased; and pump 9 operates to expand bellows 7. The controlling member 6 assumes a position further to the left, increasing the opening of valve 2.

Conversely, when the unidirectional current through winding 21 is reduced, the transfer of energy to motor 10 is reduced. The controlling member 6 correspondingly assumes a position further to the right; and there is a reduction in the flow of fuel to the burner 1.

In order to create and control the unidirectional current in winding 21, use is made of a resistance bridge including the resistance arms 22, 23, 24, and 25. Supplementing the resistance 24 is a variable resistance 26 that is controlled by the thermostat 4. Similarly, supplementing resistance 25 is a resistance 27 adjusted in accordance with the position of controlling member 6, as indicated by the dotted lines 28.

The bridge resistors 24—26 and 25—27 are joined to a common point 29, which forms one end of a diagonal of the bridge across which a unidirectional electromotive force may be impressed. This electromotive force is derived by the aid of a conventional full-wave bridge rectifier 30, shown as fed from mains 19 and 20. The output conductors 31 and 32 of this rectifier connect, respectively, with the opposite diagonal points 33 and 29 of the resistance bridge.

The winding 21 is connected across the other diagonal of the resistance bridge at points 34 and 34'. Accordingly, when the bridge is unbalanced by movement of the member 5 along the resistance 26 in a direction requiring more heat, a current will flow from point 34, through winding 21, to point 34'. This current is a function of the deviation of the temperature from the desired value. As this deviation increases, the current through winding 21 increases and, correspondingly, the energy transferred to motor 10 is increased. The control member 6 moves to the left, and the valve 2 is caused to pass more fuel to the burner 1.

Resistance 27, forming with resistance 25, one arm of the resistance bridge, is adjusted in accordance with the position of member 6, and in a direction to balance the bridge. The motor 10 is energized by an increased electromotive force until the valve stem 3 moves to a position corresponding to the balanced position of resistance 27.

Since valve 2 has been opened to a greater extent, the deviation from the desired value of the temperature will be reduced. Thermostat 4 begins to move toward its normal position. This unbalances the resistance bridge, but in such direction that the current through winding 21 flows in a reverse direction. Since the effect of the unidirectional current upon the magnetic circuit is the same, irrespective of its direction of flow, this current would serve to cause increased energization of motor 10. Such energization would serve to increase the supply of fuel, which is not necessary, as the temperature is already increasing. Accordingly, means are provided to ensure against increasing the energization of motor 10 as the thermostat 4 returns to its normal position. For this purpose, in order to accomplish this result, a blocking rectifier 35 is inserted in the circuit of winding 21. This blocking rectifier is arranged in such manner as to permit the flow of current in winding 21 only in such a direction as would correspond to a demand for greater heat. The blocking resistance also prevents flow of current when the deviation of the temperature is above the desired value.

It is desirable that the unidirectional current supplied by rectifier 30 be kept substantially constant. As the resistances 26 and 27 are varied, there would be a corresponding variation in the current supplied from the output side of this rectifier. In order to ensure against any substantial variation in the current flow, the resistance arms 22 and 23 are also variable, as by the aid of the contacts 36 and 37. These contacts are moved by the aid of the controlling member 6, as indicated by the dotted lines 38 and 39. As the controlling member 6 moves to adjust the resistance 27, the contacts 36 and 37 are also moved to adjust the resistances 22 and 23. As resistance 27 is increased, then resistances 22 and 23 are correspondingly reduced, and vice versa.

The operation of the system is apparent from the foregoing. When the temperature is at a desired value, the thermostat 4 and its movable member 5 are at a stable position. Resistances 26 and 27 are at such a value that the resistance bridge is balanced, and no current flows through winding 21. Accordingly, minimum energization of motor 10 occurs. Now, if more heat is required, the thermostat 4 moves the arm 5 to a position to unbalance the bridge, and the current will flow through the winding 21. The direction of this flow is such that current can pass the blocking rectifier 35. The motor 10 is energized by a larger electromotive force, and the pump 9 serves to increase the pressure in bellows 7. The control member 6 moves toward the left, opening the valve 2 and, at the same time, adjusting the resistance 27 in a direction to balance the bridge. As soon as the bridge is balanced, the energization of the motor 10 is reduced.

The resistances 26 and 27 may be continuously varied in this manner over a limited range, the variations in the unidirectional current occurring quite rapidly. Valve 2 is preferably so made that its initial or normal opening may be adjusted independently of the automatic control system.

In Fig. 2, a different form of control is utilized. In this instance, upon an iron core 40 is mounted a reactance coil 41 disposed in series with a source of alternating current, and with a torque motor 42. This torque motor 42 exerts a force controlled by the reactance of coil 41. The motor operates against a torque spring 43, and it comes to rest at a position corresponding to an equilibrium between the reaction of spring 43 and the torque exerted by the motor 42.

For varying the reactance of winding 41, use is made of a bridge circuit identical to that shown in Fig. 1. In this case, however, the output side of the bridge is connected to a winding 44 on the iron core 40. The more the bridge is unbalanced in one direction, the more current will flow through winding 44 and the greater saturation of the core 40. The reactance of coil 41 is correspondingly reduced and, accordingly, the motor 42 may advance further against the torque of spring 43.

The motor 42 operates through gearing 45 to move a valve stem 46 of a valve through which the fuel for the burner 1 passes. For this purpose a control member 47 is utilized that may, as before, serve to adjust the resistance 27, as well as the resistances 36 and 37.

The inventor claims:

1. In combination: a bridge circuit having two adjacent variable arms; means for supplying unidirectional current across that diagonal of the bridge which extends between said variable arms; a magnetic circuit; a first winding on said magnetic circuit connected across the other diagonal of the bridge; an electrically energized motor means having a controlling member, the position of which is determined in accordance with the force exerted by the motor means; a second winding on said magnetic circuit for determining the rate of energy transfer to the motor means; means responsive to a deviation of a condition from a value of that condition for varying the first of said variable bridge arms and thereby to cause the current through the first winding to be a function of said deviation; means operated by said controlling member for reducing said deviation; and means for varying the second of said variable bridge arms in accordance with the position of said controlling member, and in a direction to balance the bridge.

2. In combination: a bridge circuit having two adjacent variable arms; means for supplying unidirectional current across that diagonal of the bridge which extends between said variable arms; a magnetic circuit; a first winding on said magnetic circuit connected across the other diagonal of the bridge; an electrically energized motor means having a controlling member, the position of which is determined in accordance with the force exerted by the motor means; a second winding on said magnetic circuit for determining the rate of energy transfer to the motor means; means responsive to a deviation of a condition from a value of that condition for varying the first of said variable bridge arms and thereby to cause the current through the first winding to be a function of said deviation; means operated by said controlling member for reducing said deviation; means for varying the second of said variable bridge arms in accordance with the position of said controlling member, and in a direction to balance the bridge; and means precluding an increase in the energization of the motor means except when such increase would serve to reduce the deviation.

3. In combination: a bridge circuit having two adjacent variable arms; means for supplying unidirectional current across that diagonal of the bridge which extends between said variable arms; a magnetic circuit; a first winding on said magnetic circuit connected across the other diagonal of the bridge; an electrically energized motor means having a controlling member, the position of which is determined in accordance with the force exerted by the motor means; a second winding on said magnetic circuit for determining the rate of energy transfer to the motor means; means responsive to a deviation of a condition from a value of that condition for varying the first of said variable bridge arms and thereby to cause the current through the first winding to be a function of said deviation; means operated by said controlling member for reducing said deviation; means for varying the second of said variable bridge arms in accordance with the position of said controlling member, and in a direction to balance the bridge; and means precluding an increase in the energization of the motor means except when such increase would serve to reduce the deviation, comprising means permitting the flow of current in said first winding only in one direction.

4. In combination: a bridge circuit having two adjacent variable arms; means for supplying unidirectional current across that diagonal of the bridge which extends between said variable arms; a magnetic circuit; a first winding on said magnetic circuit connected across the other diagonal of the bridge; an electrically energized motor means having a controlling member, the position of which is determined in accordance with the force exerted by the motor means; a second winding on said magnetic circuit for determining the rate of energy transfer to the motor means; means responsive to a deviation of a condition from a value of that condition for varying the first of said variable bridge arms and thereby to cause the current through the first winding to be a function of said deviation; means operated by said controlling member for reducing said deviation; means for varying the second of said variable bridge arms in accordance with the position of said controlling member, and in a direction to balance the bridge; and means operated by said controlling member for causing the current flow through the bridge between the opposite ends of the first diagonal, to remain substantially constant.

5. In combination: a bridge circuit having two adjacent variable arms; means for supplying unidirectional current across that diagonal of the bridge which extends between said variable arms; a magnetic circuit; a first winding on said magnetic circuit connected across the other diagonal of the bridge; an electrically energized motor means having a controlling member, the position of which is determined in accordance with the force exerted by the motor means; a second winding on said magnetic circuit for determining the rate of energy transfer to the motor means; means responsive to a deviation of a condition from a value of that condition for varying the first of said variable bridge arms and thereby to cause the current through the first winding to be a function of said deviation; means operated by said controlling member for reducing said deviation; means for varying the second of said variable bridge arms in accordance with the position of said controlling member, and in a direction to balance the bridge; and means operatively connected to one of said windings for precluding an increase in the energization of the motor means except when such increase would serve to reduce the deviation.

WILLIAM A. RAY.

REFERENCES CITED

The following references are of record in the file of this patent:

UNITED STATES PATENTS

| Number | Name | Date |
|---|---|---|
| 1,376,633 | Obermaier | May 3, 1921 |
| 1,586,233 | Anschutz-Kaempfe | May 25, 1926 |
| 1,851,974 | Bristol | May 5, 1932 |
| 1,954,142 | Moffett | Apr. 10, 1934 |
| 2,015,967 | Ryder | Oct. 1, 1935 |
| 2,102,911 | Perry | Dec. 21, 1937 |
| 2,136,695 | Laing | Nov. 15, 1938 |
| 2,227,468 | Sweeney | Jan. 7, 1941 |
| 2,269,411 | Newton | Jan. 6, 1942 |